(12) United States Patent  (10) Patent No.: US 9,305,198 B2
Thompson et al.  (45) Date of Patent: Apr. 5, 2016

(54) IMAGING READER WITH IMPROVED ILLUMINATION

(71) Applicant: Datalogic ADC, Inc., Eugene, OR (US)

(72) Inventors: Ryan B. Thompson, Eugene, OR (US); Alan Shearin, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 51 days.

(21) Appl. No.: 13/911,854

(22) Filed: Jun. 6, 2013

(65) Prior Publication Data

US 2013/0327829 A1  Dec. 12, 2013

Related U.S. Application Data

(60) Provisional application No. 61/657,660, filed on Jun. 8, 2012.

(51) Int. Cl.
*G06K 7/00* (2006.01)
*G06K 7/10* (2006.01)

(52) U.S. Cl.
CPC .......... *G06K 7/10831* (2013.01); *G06K 7/1096* (2013.01); *G06K 7/10732* (2013.01); *G06K 7/10841* (2013.01)

(58) Field of Classification Search
CPC ...................................................... G06K 7/14
See application file for complete search history.

(56) References Cited

U.S. PATENT DOCUMENTS

| 5,325,276 A | 6/1994 | Sullivan |
| 5,449,892 A | 9/1995 | Yamada |
| 5,710,418 A | 1/1998 | Tawara |
| 5,723,868 A | 3/1998 | Hammond, Jr. et al. |

(Continued)

FOREIGN PATENT DOCUMENTS

| JP | 2009015634 | 1/2009 |
| JP | 2009-134657 A | 6/2009 |

(Continued)

OTHER PUBLICATIONS http://www.wdbsa.nl/Lucas.htm. "BSA WD M20 Electrical Equipment". Feb. 6, 2015. www.waybackmachine.com. p. 4-6.*

(Continued)

*Primary Examiner* — Thien M Le
*Assistant Examiner* — Asifa Habib
(74) *Attorney, Agent, or Firm* — Stoel Rives LLP

(57) ABSTRACT

A data reading system, such as for reading optical codes being passed through a read zone, including one or more imagers, and at least one illumination module, all disposed in a reader housing, the illumination module in one configuration having a reflector housing comprised of a cone-shaped structure of generally rectangular cross-section, with a top inner surface and a bottom inner surface, wherein area of the cross-section of the cone-shaped structure increasing from a rear end to a front end, and an illumination source (such as a plurality of light emitting diodes) disposed at the rear end of the reflector housing and operative to generate illumination out through the reflector housing along an outgoing illumination path, the top inner surface of the reflector housing being a surface of high reflectivity relative to the bottom inner surface of the reflector housing which has a surface of relatively low reflectivity. Also disclosed are imager configurations for providing multiple fields of views of multiple imagers co-mounted on a common PCB.

15 Claims, 17 Drawing Sheets

(56) References Cited

U.S. PATENT DOCUMENTS

| | | | |
|---|---|---|---|
| 5,756,981 | A | 5/1998 | Roustaei et al. |
| 6,351,594 | B1 | 2/2002 | Nakamura et al. |
| 6,547,416 | B2 | 4/2003 | Pashley et al. |
| 6,641,284 | B2 * | 11/2003 | Stopa et al. ............ 362/240 |
| 7,614,563 | B1 | 11/2009 | Nunnink |
| 7,617,984 | B2 | 11/2009 | Nunnink |
| 7,634,104 | B2 | 12/2009 | Alasia |
| 7,753,269 | B2 | 7/2010 | Russell |
| 8,450,708 | B2 | 5/2013 | Liu et al. |
| 8,894,257 | B2 * | 11/2014 | Rice et al. ............. 362/516 |
| 9,135,484 | B2 | 9/2015 | Shearin et al. |
| 2006/0237636 | A1 | 10/2006 | Lyons et al. |
| 2007/0090193 | A1 * | 4/2007 | Nunnink et al. ......... 235/473 |
| 2008/0142600 | A1 * | 6/2008 | Joseph et al. ........ 235/462.42 |
| 2008/0277478 | A1 | 11/2008 | Kotlarsky et al. |
| 2011/0108628 | A1 | 5/2011 | Brock et al. |
| 2012/0018516 | A1 | 1/2012 | Gao et al. |
| 2012/0074338 | A1 | 3/2012 | Shearin |
| 2013/0306727 | A1 | 11/2013 | Shearin et al. |

FOREIGN PATENT DOCUMENTS

| | | |
|---|---|---|
| KR | 10-2003-0093996 A | 12/2003 |
| WO | WO 2012/012651 | 1/2012 |

OTHER PUBLICATIONS

International Search Report and Written Opinion, mailed Feb. 18, 2014 for PCT International Application No. PCT/US2013/044605.

Notice of Allowance dated May 8, 2015, Issue Fee Payment dated Aug. 6, 2015, and set allowed claims from U.S. Appl. No. 13/232,760 (14 pages).

Communication Pursuant to Rules 70(2) and 70a(2) dated Jan. 11, 2016 and Extended Search Report dated Dec. 21, 2015 for European Patent Application No. 13800477.5, 8 pages.

* cited by examiner

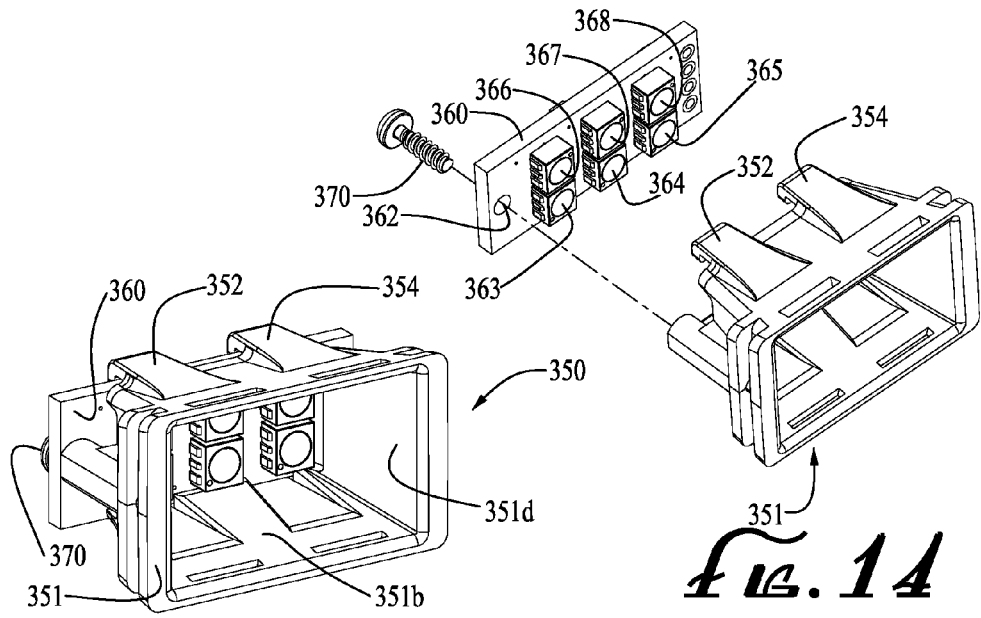
FIG. 13
FIG. 14
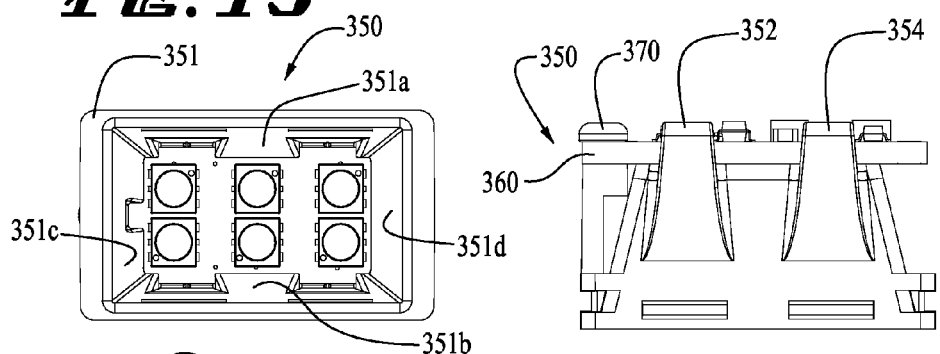
FIG. 15
FIG. 16
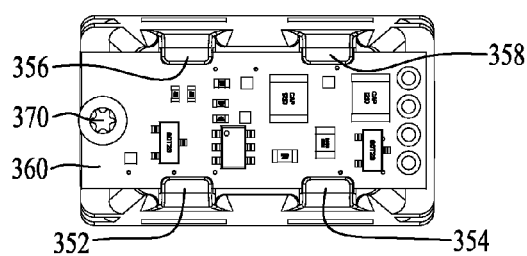
FIG. 17

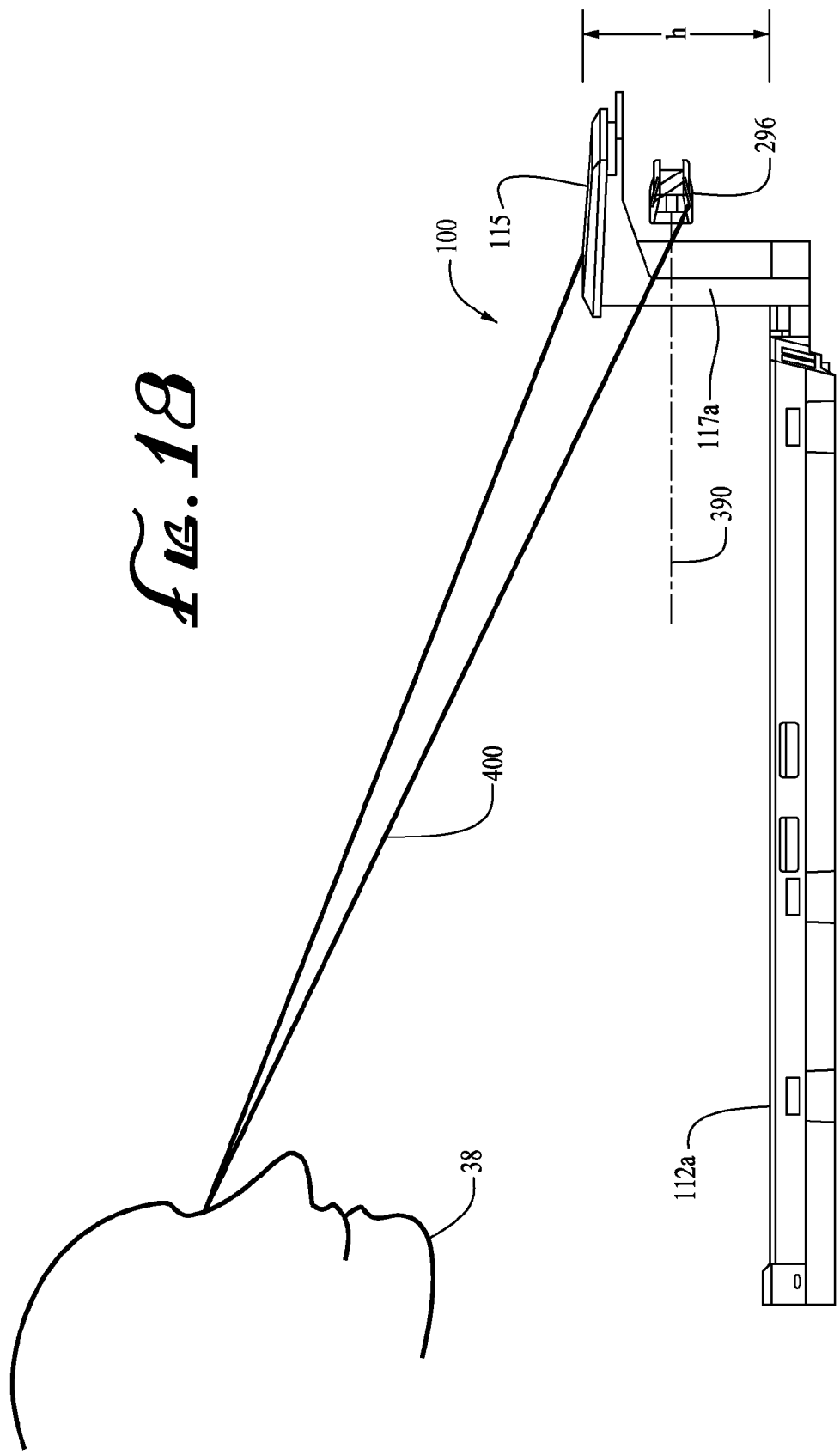

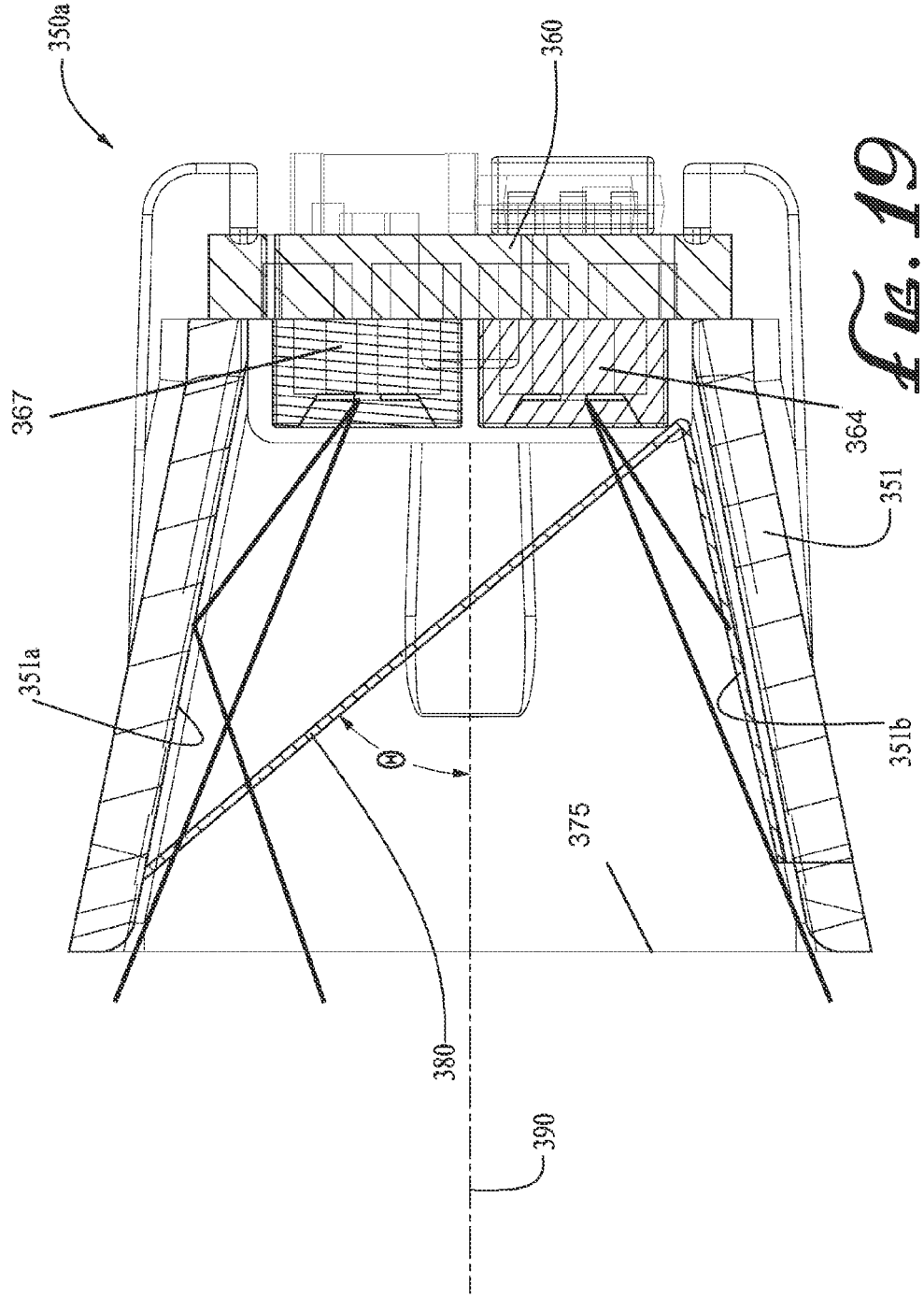

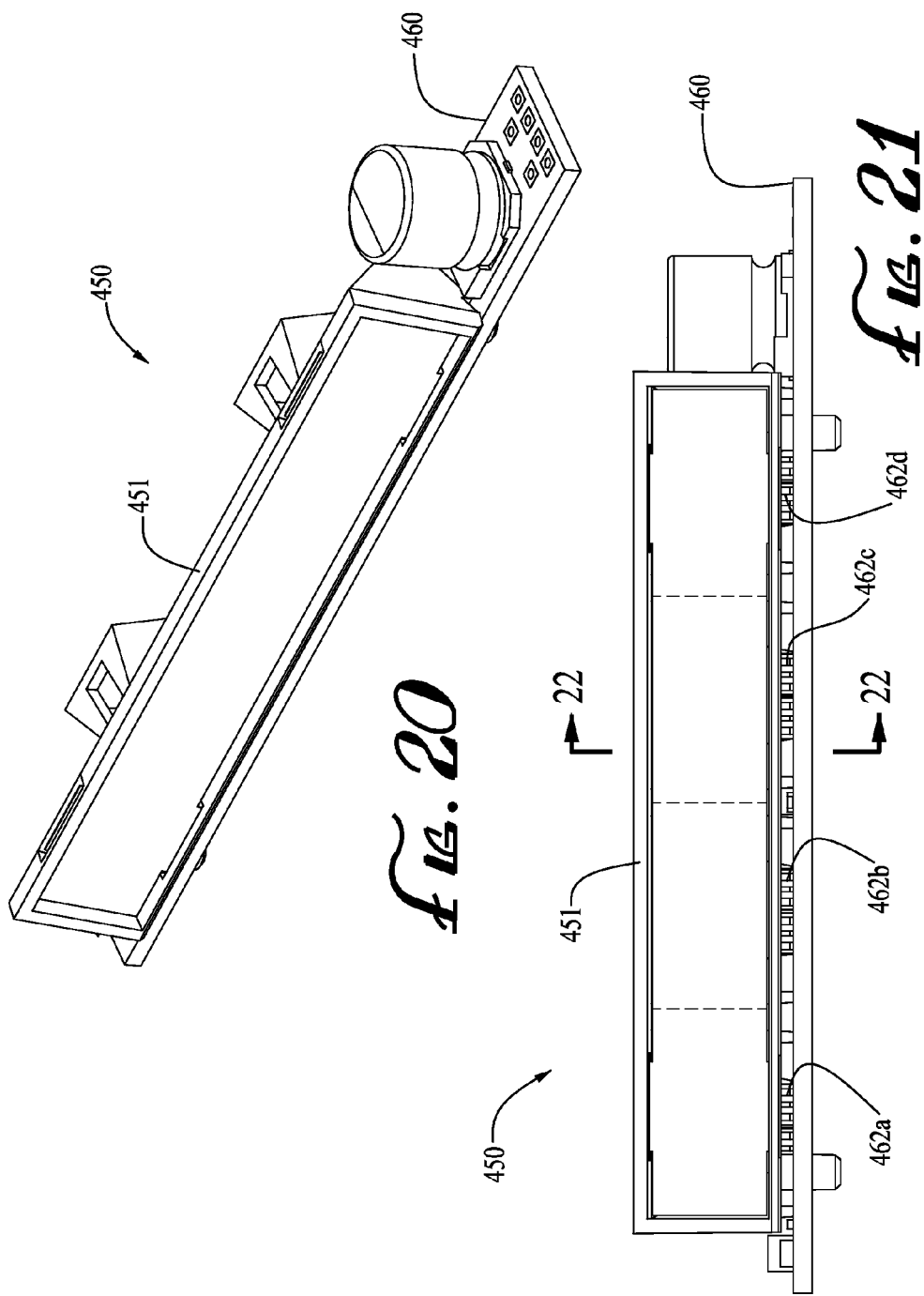

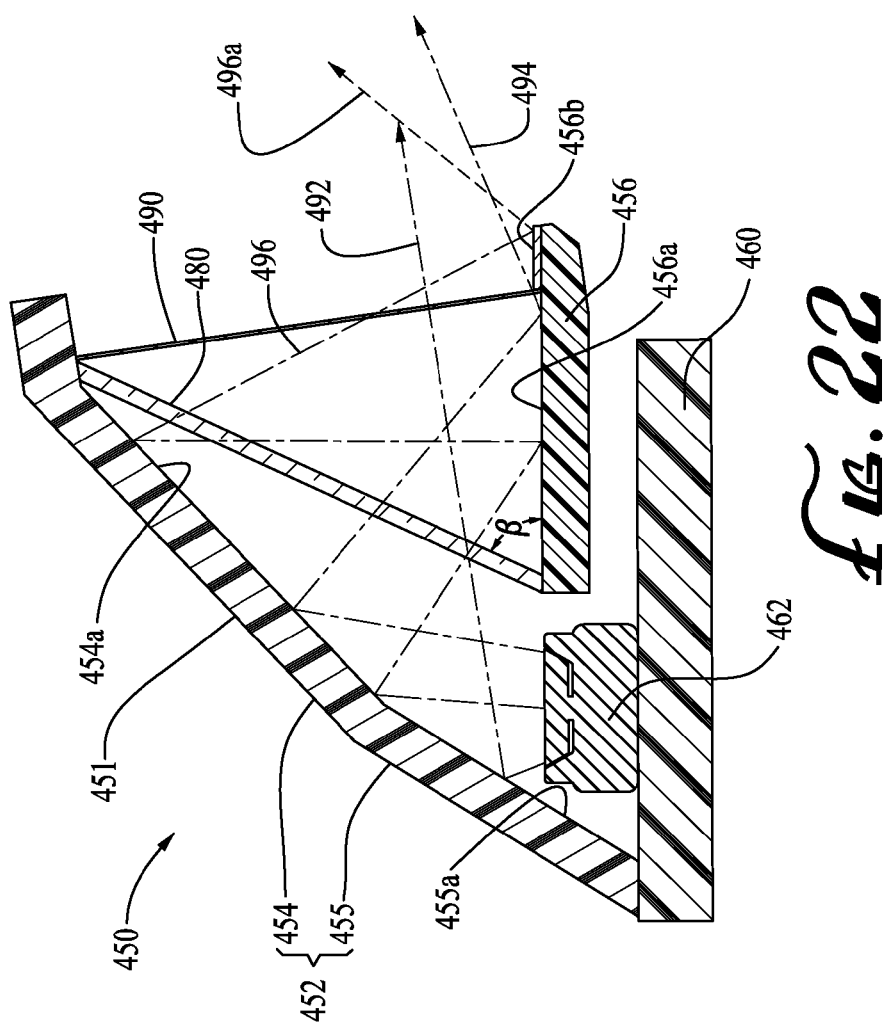

IMAGING READER WITH IMPROVED ILLUMINATION

RELATED APPLICATION DATA

This application claims priority under 35 U.S.C. §119(e) to U.S. Provisional Application No. 61/657,660 filed on Jun. 8, 2012, hereby incorporated by reference.

BACKGROUND

The field of this disclosure relates generally to systems and methods for data reading and/or image capture, and more particularly, to illumination systems particularly applicable to imaging data readers.

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes.

Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. Though some imaging readers are capable of using ambient light illumination, an imaging reader typically utilizes a light source to illuminate the item being read to provide the required signal response in the imaging device. An imager-based reader utilizes a camera or imager to generate electronic image data, typically in digital form, of an optical code. The image data is then processed to find and decode the optical code.

In both laser-based and imager-based types of readers, dual plane or bioptic style readers (e.g., readers with a horizontal window and a vertical window) are popular for high volume applications because they provide multiple perspectives or fields of view into the read region. These readers typically have bright illumination sources that are potentially distracting to the operator. Thus the present inventors have recognized that it is desirable to minimize bright light from the illumination sources of these readers from reaching or interfering with the sight lines of the operator or the customer.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

FIG. 13 is a front isometric view of an illumination module according to an embodiment.

FIG. 14 is a partially exploded isometric view of the illumination module of FIG. 13.

FIG. 15 is a front elevation view of the illumination module of FIG. 13.

FIG. 16 is a top plan view of the illumination module of FIG. 13.

FIG. 17 is a rear elevation view of the illumination module of FIG. 13.

FIG. 18 is a diagrammatic side view of the data reader of FIGS. 1-2 illustrating line of sight for a user to/from an illumination module.

FIG. 19 is a diagrammatic side view of an illumination module according to a first alternate embodiment.

FIGS. 20-22 illustrate an illumination module according to a second alternate embodiment with FIG. 21 being an isometric view, FIG. 21 being a front side elevation view and FIG. 22 being a cross-sectional view of FIG. 21 taken along line 22-22.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. Some embodiments of these data readers and systems may provide for improved/enhanced reading performance by providing multiple image fields to capture multiple views. In the following description of the figures and any example embodiments, it should be understood that any image fields or fields of view related to any imager may be partitioned into two or more regions, each of which may be used to capture a separate view/perspective of the view volume. In addition to providing more views than imagers, such embodiments may enhance the effective view volume beyond the view volume available to a single imager having a single point of view.

In the following description of the figures and any example embodiments, it should be understood that use of the data reader having the described features in a retail establishment is merely one use for such a system and should not be considered as limiting. Other uses for data readers with the characteristics and features described herein may be possible, for example, in an industrial location such as a parcel distribution (e.g., postal) station.

Figure 1:
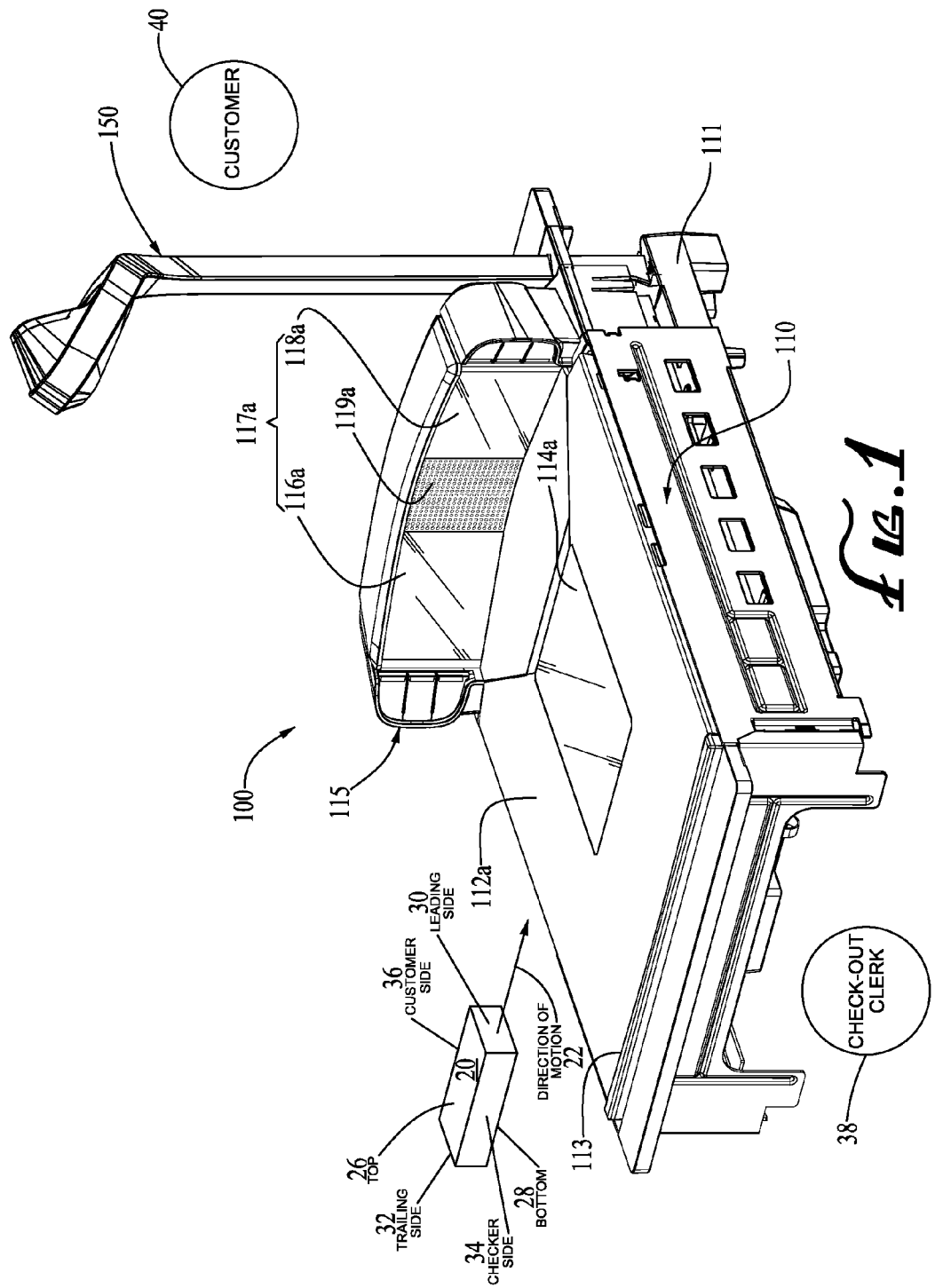
FIG. 1 is an isometric view of a data reader illustrating an exemplary six-sided box-shaped object that may be passed through a view volume of the data reader, according to a first embodiment.
Figure 2:
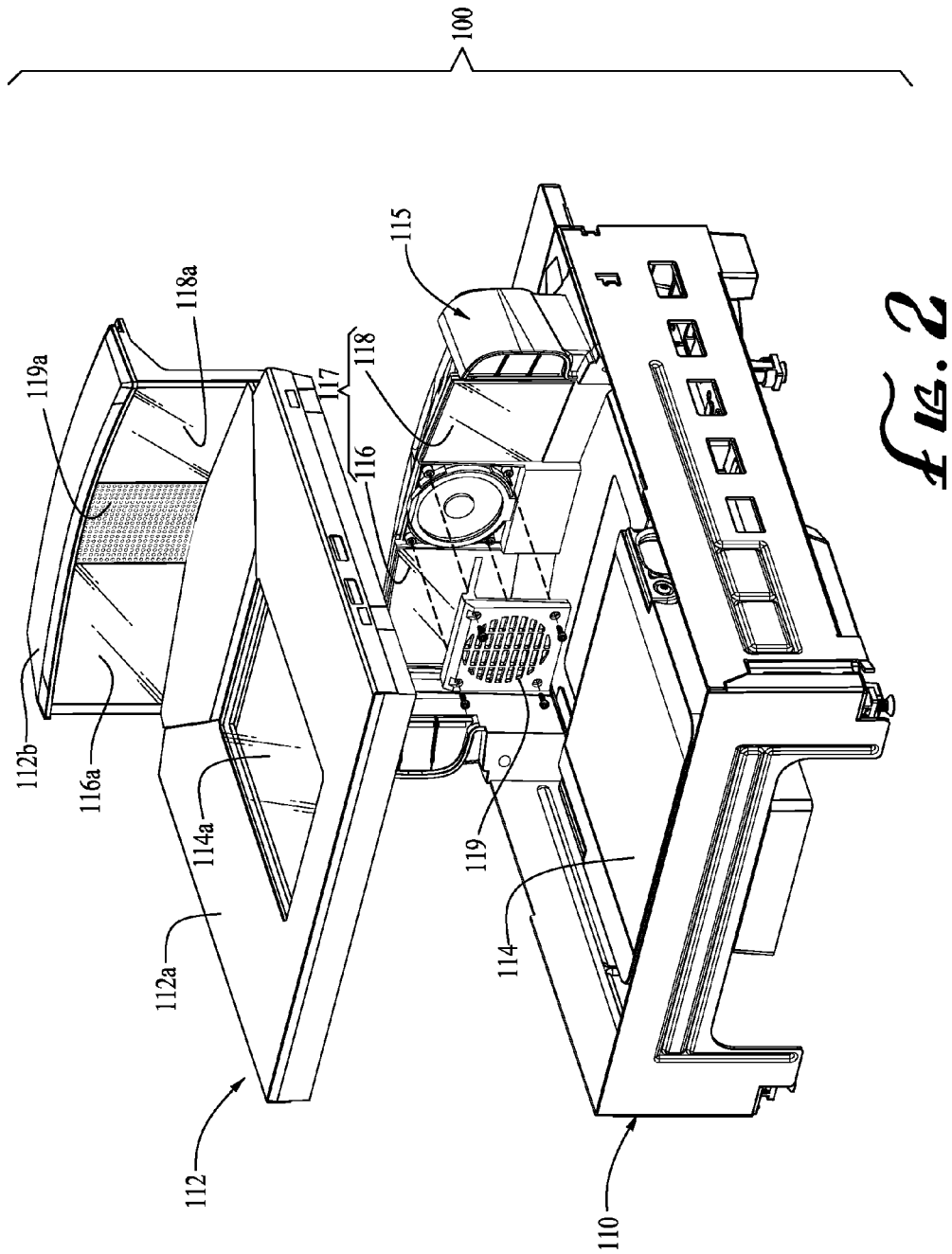
FIG. 2 is a front isometric, partially exploded view of the data reader of FIG. 1.

FIGS. 1-2 illustrate a data reader 100 and an exemplary object 20 that may be passed through a view volume of the data reader 100. The data reader 100 comprises a multiple-window reader having a lower section 110 and an upper section 115 arranged generally orthogonally to one another. The lower section 110 includes a horizontal window 114. The vertical section 115 in this embodiment includes a split window 117 with a first window section 116 and a second window section 118, the window sections 116, 118 divided by a speaker grille 119 disposed therebetween. The components of the data reader are mounted (directly or indirectly) to a common base or chassis 111.

The data reader 100 is provided with a cover, which is preferably removable, and which (in the scale version) may comprise a weigh platter 112. Preferably the cover/weigh platter 112 includes both horizontal 112a and vertical 112b sections in a dual plane configuration (as well shown in the partially exploded view of FIG. 2) such as the All-Weighs® platter available from Datalogic ADC, Inc. of Eugene, Oreg. or as described in U.S. Pat. No. RE 40,071, the disclosure of which is hereby incorporated by reference. The platter upper section 112b includes a split window 117a with a first window section 116a and a second window section 118a, the window sections 116a, 118a divided by the grille 119a disposed therebetween. The platter lower section 112a includes a horizontal window 114a disposed in a recessed area and preferably mounted flush with the surface of the platter section 112a. The horizontal portion 112a of the weigh platter 112 may include a bump or raised section 113 which also may be referred to as a rail for inhibiting items, such as spherical fruit, from rolling off the edge of the platter section 112a during weighing operations. The data reader 100 may be configured in different lengths to accommodate different checkstand sizes or configurations. For example, it is noted that the exploded view of the reader 100 in FIG. 2 is a slightly shorter version than the data reader 100 of FIG. 1 and the platter 112 in FIG. 2 is illustrated without the optional fruit rail 113 shown in FIG. 1.

For purposes of description, as shown in FIG. 1, the data reader 100 may be described with reference to an object 20. The object 20 is represented by a rectangular shaped six-sided polyhedron, such as a cereal box (hereinafter referred to as a box-shaped item, package or object) being passed through a read region above the window 114a and to the sides of windows 116a, 118a. For convenience of description, referring to FIG. 1, this box-shaped object 20 may be described with respect to its direction of motion/travel 22 across a surface of the platter 112. The illustrated example shows the direction of motion 22 of the object 20 being in a left-to-right scheme, but other directions such as right-to-left are applicable.

For the purposes of description relative to the ability of a data reader 100 to read certain of the sides of the box-shaped object 20 being passed through the read volume defined by the windows 114a, and 117a in the orientation as illustrated, the box-shaped object 20 may be described as having a top side 26, a bottom side 28, and four lateral sides 30, 32, 34, and 36. The lateral sides may be referred to as the leading (or right lateral) side 30 (the side leading the object as it is passed through the read region), the trailing (or left lateral) side 32 (the trailing side of the object as it is passed through the read region), the checker (or front lateral) side 34 (due to its proximity to a checkout clerk 38), and the customer (or rear lateral) side 36 (due to its proximity to a customer 40). A housing section or the vertical housing portion 115 of a data reader 100 may separate the customer 40 from the object 20 if the data reader is a vertical optical code reader or a bi-optic optical code reader. The customer (or rear lateral) side 36 may alternatively be described as a wall side 36 or a side oriented generally vertically facing the vertical window 115. The checker (or front lateral) side 34 may alternatively be described as the side facing opposite the customer side 36. The front and rear lateral sides 34, 36 may be described as being disposed to one side of the central window 114a in a direction parallel to the direction of motion 22 for the item 20.

It is further noted that description regarding the position of the checker 38 or the customer 40 is meant to facilitate explanation and establish a relative frame of reference related to a typical position of a customer 40 and a checkout clerk 38, as illustrated in FIG. 1, and is not intended to be limiting. It should be understood that the data reader 100 may be used without a checkout clerk 38 and/or the customer 40, and either one may be positioned at any side of the data reader 100. In addition, the object 20 is described as a box-shaped package for convenience, but it should be understood that the object 20 may encompass other shapes, including irregularly shaped packages, such as a bag of oranges, potato chips, or the like.

The view volume may be a function of the enclosure and form of the data reader and the perspectives of the views in which images of the objects are captured. A perspective may encompass a location, direction, angle, or any combination of the foregoing, or the like, that characterize a vantage or point of view for seeing, imaging, visualizing via machine vision, or illuminating the object 20 or a part of the object 20.

The reader 100 acquires image perspectives out of each of the windows 114a and 117a in order to provide multiple fields of view so as to capture the bottom side 28 and all lateral sides (leading side 30, trailing side 32, checker side 34 and customer side 36). Depending upon the size of the object 20 being passed through the read region, the object 20 typically being dragged across the surface of the platter 112a, it may be unlikely/difficult or even impossible for views out of the windows 116a, 118a to have a view of the top side 26 of the object 20 in order to read an optical code on that top side. To improve such top side reading, the optional post-mounted top down reader 150 is provided. The details of example top down readers are described in U.S. application No. 61/657,634 entitled Optical Scanner With Top Down Reader, filed Jun. 8, 2012, and U.S. application Ser. No. 13/895,258 filed May 15, 2013, both applications hereby incorporated by reference.

Though ambient light may provide sufficient illumination, additional illumination may be provided. Details of an example imaging and illumination schemes will be described with particular reference to FIGS. 3-22.

Figure 3:
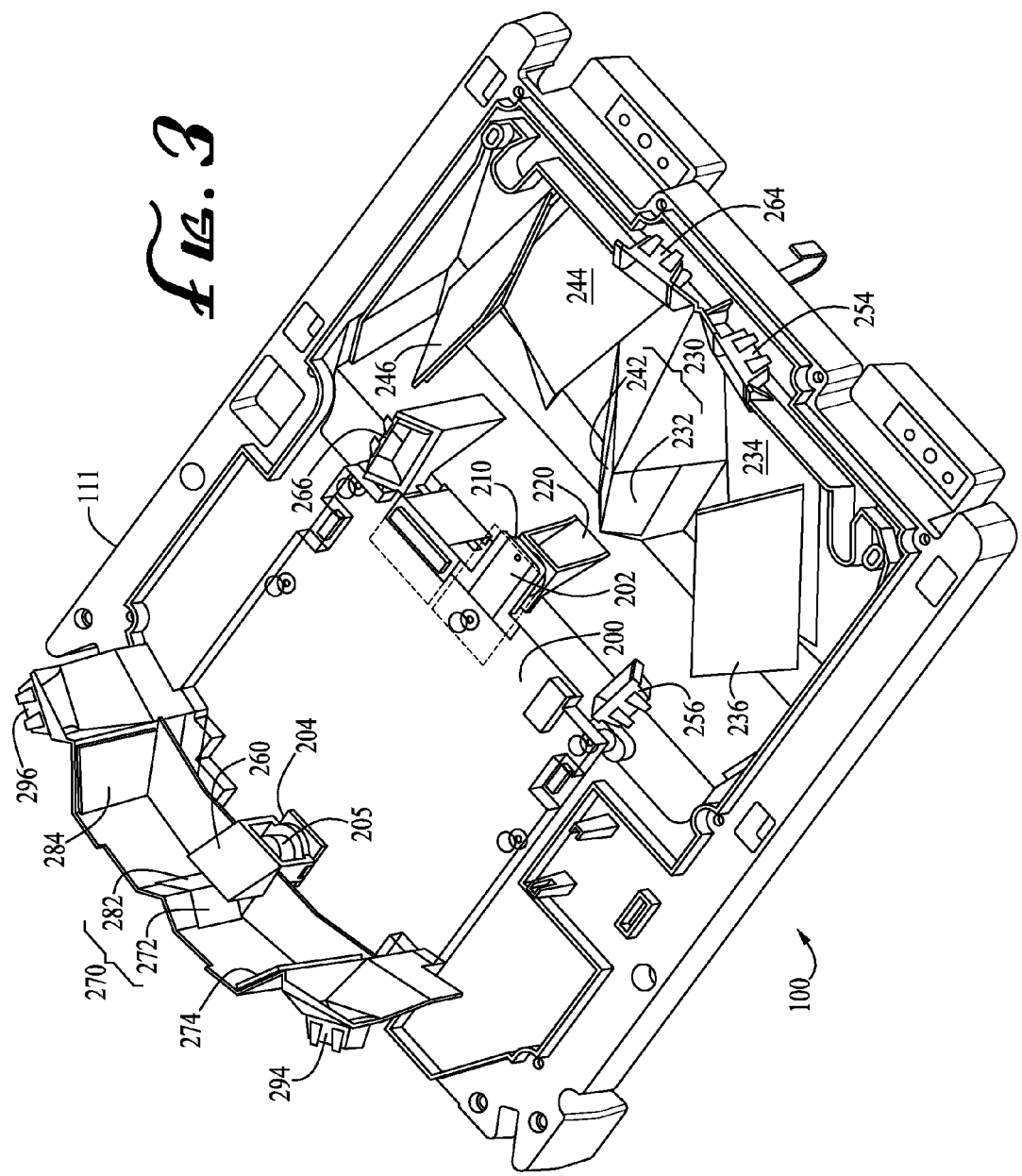
FIG. 3 is a diagrammatic isometric view of an internal mirror and optics arrangement of the data reader of FIGS. 1-2.

FIG. 3 is a diagrammatic view of the data reader 100 with various upper elements removed to reveal internal imaging and illumination components as mounted on the lower chassis 111. The data reader 100 includes a main printed circuit board (PCB) 200 mounted on the lower chassis 111. The PCB 200 includes various circuitry including microprocessor(s), imagers 204, 210, memory and other electronics. In this embodiment, the horizontal imager 210 and the vertical imager 204 are disposed on a common PCB 200, but separate PCBs may alternately be implemented.

The imaging and illumination components for the horizontal section will now be described. As shown in FIG. 3, the PCB 200 includes an extended tab section 202, the horizontal imager 210 being mounted on a bottom surface of the tab section 202, facing downwardly.

Figure 4:
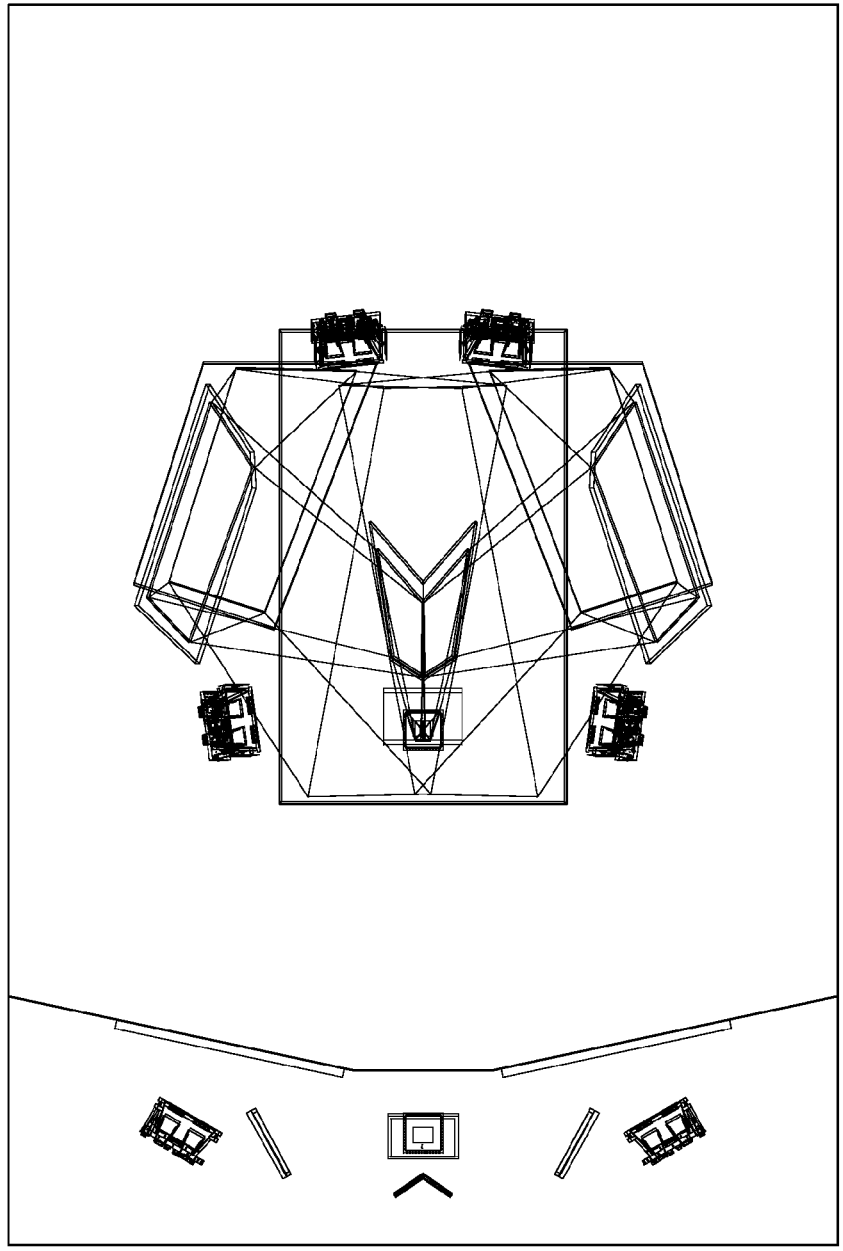
FIG. 4 is a diagrammatic top view of the data reader of FIGS. 1-3 showing imaging paths from the lower reader section.
Figure 5:
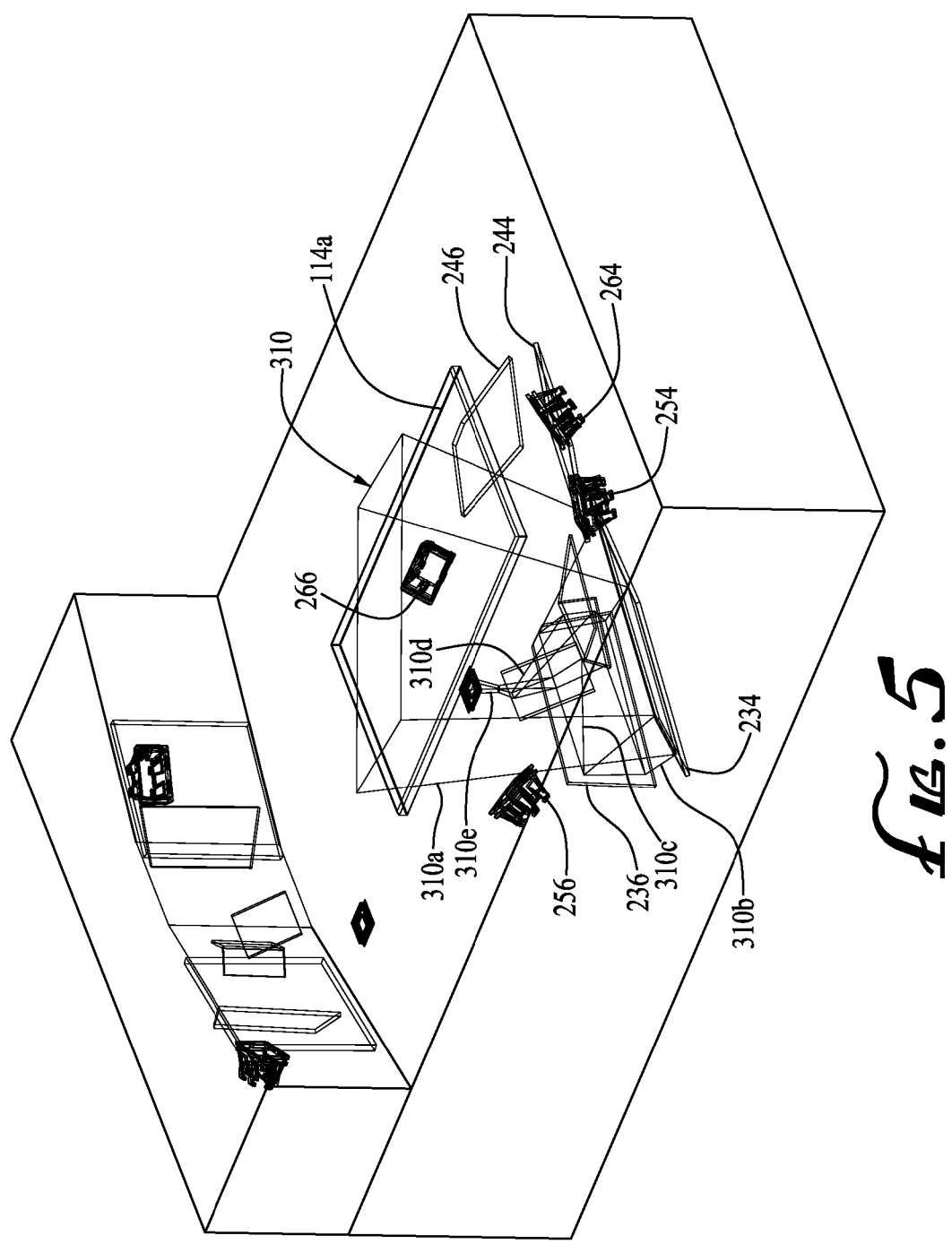
FIG. 5 is a diagrammatic isometric view of the data reader of FIGS. 1-3 showing imaging path from the left side of the lower reader section.

As shown in FIGS. 3-5, the field of view 310 from the right side of the bottom imager 210 provides a view of a bottom side 28, checker side 34 and a trailing side 32 of the item 20 being passed through the view volume. The field of view 310 has a first (left side) view segment 310a passing through the windows 114a, 114 then is redirected upwardly by primary fold mirror 234, whereby second view segment 310b passes to and is redirected sidewardly by secondary mirror 236, whereby third view segment 310c passes to and is redirected sidewardly by tertiary mirror 232 (the left side of split mirror 230), whereby fourth view segment 310d is directed onto quaternary mirror 220 which then reflects a fifth view segment 310e upward where it is focused by lens system onto the right side region of the imager 210 (the fifth view segment 310e crosses over as it is being focused by the focusing lens).

Figure 6:
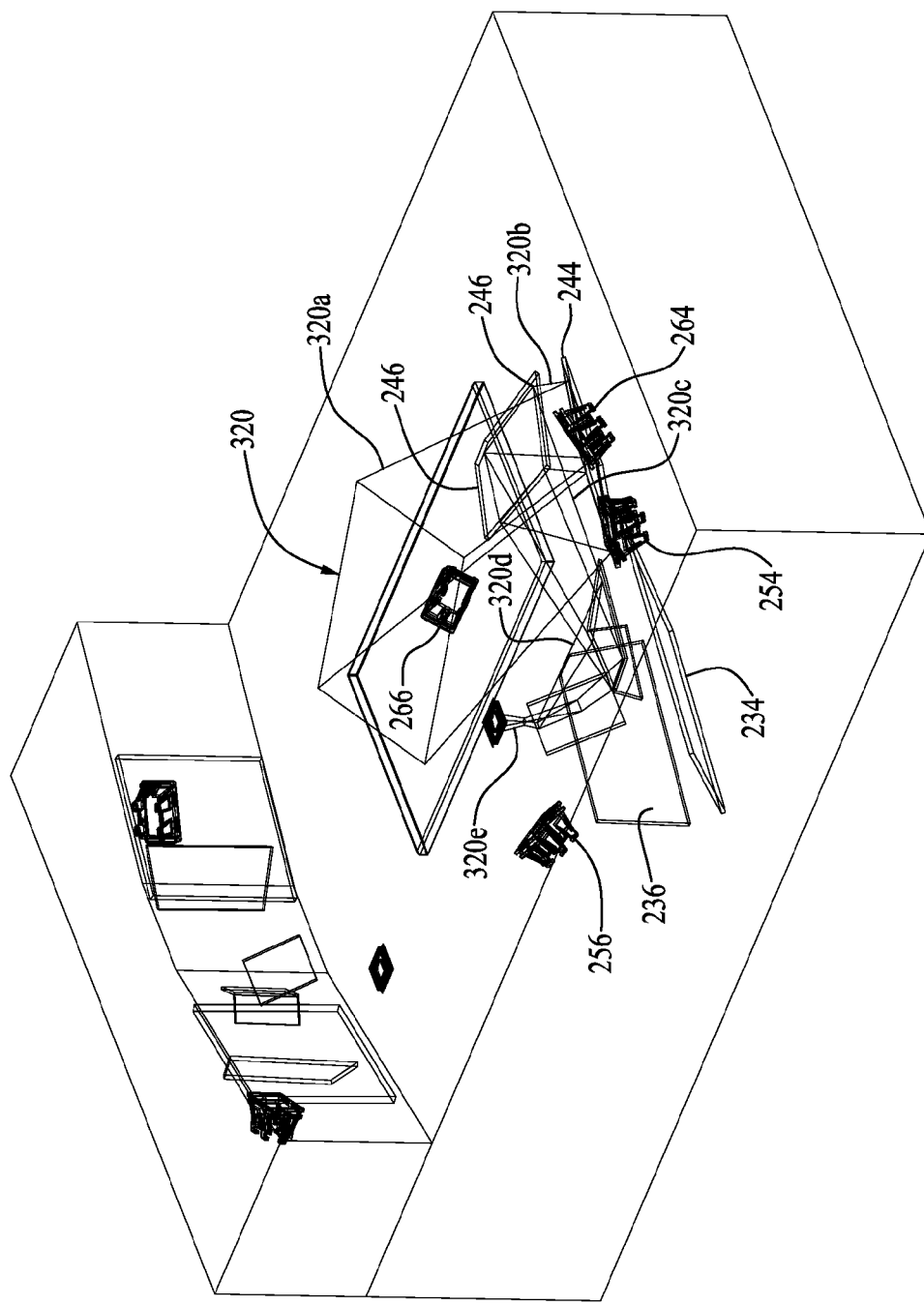
FIG. 6 is a diagrammatic isometric view of the data reader of FIGS. 1-3 showing imaging path from the right side of the lower reader section.

In similar fashion on the other side, as shown in FIGS. 3, 4 and 6, the field of view 320 provides a view of a bottom side 28, checker side 34 and a leading side 30 of the item 20 being passed through the view volume. The field of view 320 of the left side of the bottom imager 210 has a first (right side) view segment 320a passing through the windows 114a, 114 then is redirected upwardly by primary fold mirror 244, whereby second view segment 320b passes to and is redirected sidewardly by secondary mirror 246, whereby third view segment 320c passes to and is redirected sidewardly by tertiary mirror 242 (the right side of split mirror 230), whereby fourth view segment 320d is directed onto quaternary mirror 220 which then reflects a fifth view segment 320e upward where it is focused by a lens system onto the left side region of the imager 210 (the fifth view segment 320e crosses over as it is being focused by the focusing lens).

Figure 7:
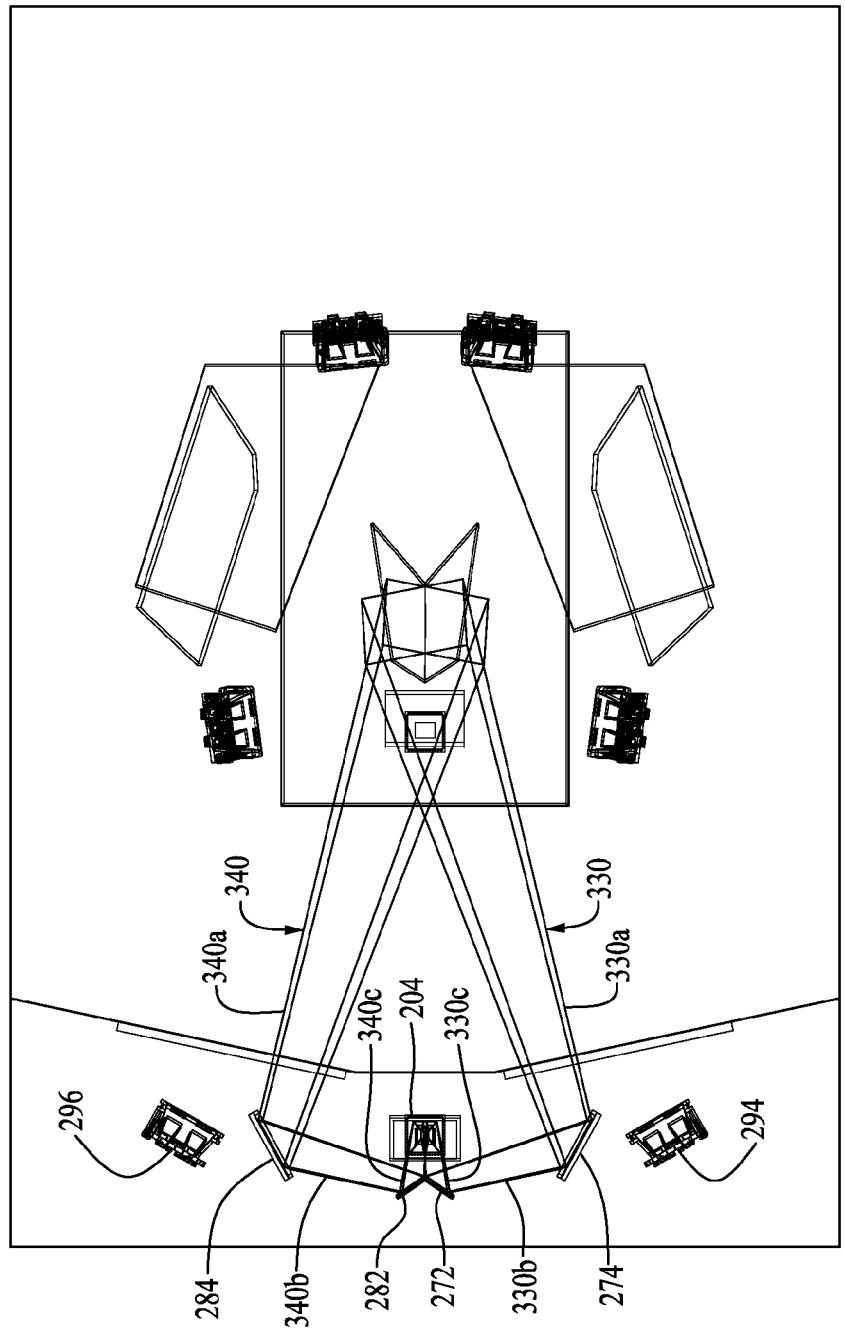
FIG. 7 is a diagrammatic top view of the data reader of FIGS. 1-3 showing imaging paths from the upper reader section.
Figure 8:
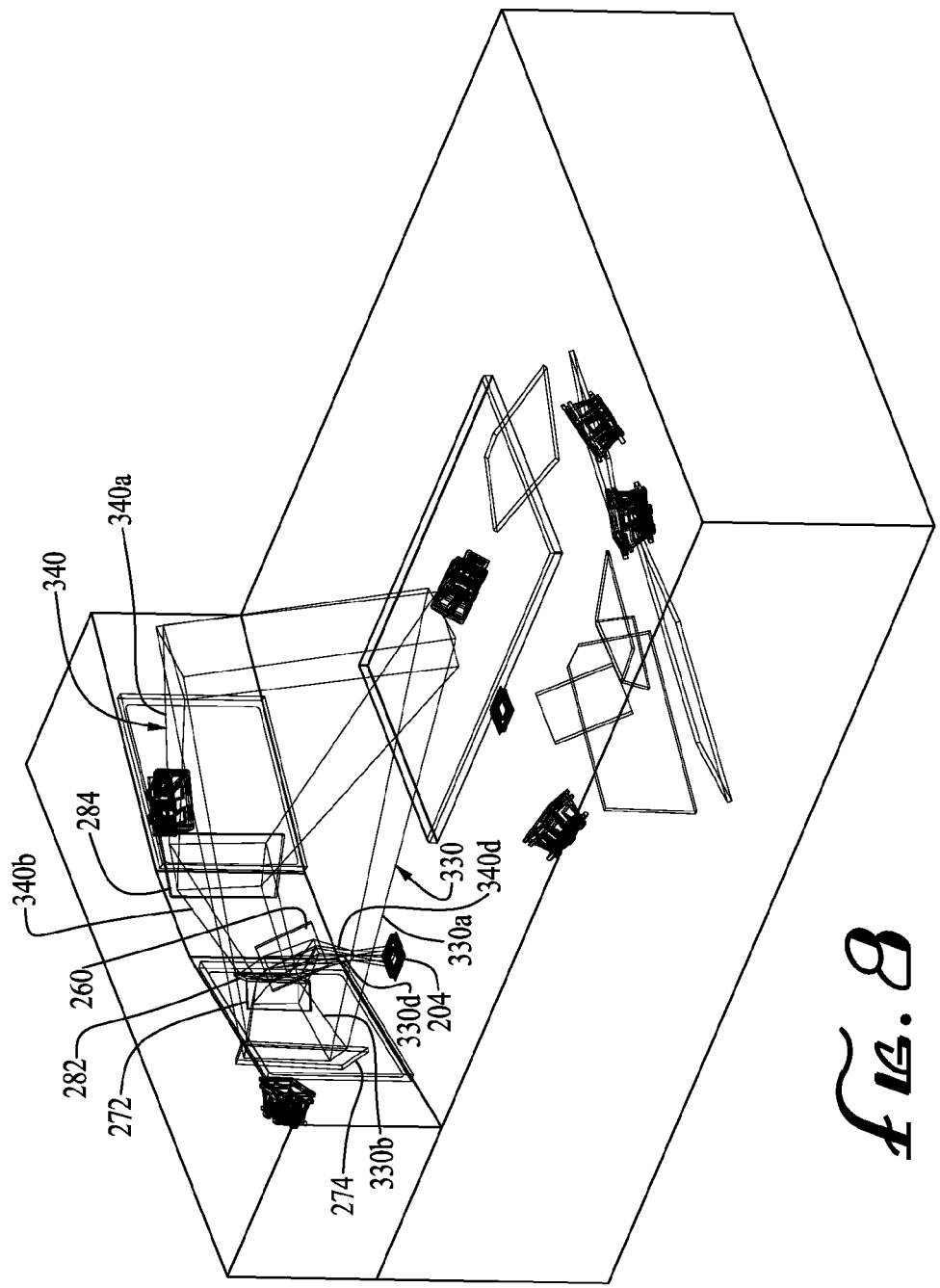
FIG. 8 is a diagrammatic isometric view of the data reader of FIGS. 1-3 showing imaging paths from the upper reader section.

As shown in FIGS. 3 and 7-8, the field of view 330 from the right side of the top imager 204 provides a view of a customer side 40 and a trailing side 32 of the item 20 being passed through the view volume. The field of view 330 has a first view segment 330a passing in through the windows 116a, 116 then is redirected sidewardly by primary fold mirror 274 whereby a second view segment 330b passes to and is redirected forwardly (toward the checker 38) by secondary mirror 272 (which is the left side of split mirror 270), whereby third view segment 330c passes to and is redirected downwardly by tertiary mirror 260, whereby the fourth view segment 330d is focused by lens system 205 onto the right side region of the imager 204.

In similar fashion on the other side, the field of view 340 from the left side of the top imager 204 provides a view of the customer side 40 and the leading side 30 of the item 20 being passed through the view volume. The field of view 340 has a first view segment 340a passing in through the windows 118a, 118 then is redirected sidewardly by primary fold mirror 284 whereby a second view segment 340b passes to and is redirected forwardly (toward the checker 38) by secondary mirror 282 (which is the right side of split mirror 270), whereby third view segment 340c passes to and is redirected downwardly by tertiary mirror 260 whereby the fourth view segment 340d is focused by lens system 205 onto the left side region of the imager 204.

The imager 210 may comprise two separate imagers (mounted, for example, on a common printed circuit board), one for each field of view 310, 320 or the imager may comprise a single component with a single imaging area wherein different fields of view can be imaged onto separate regions of the imaging area. Similarly, the imager 204 may comprise two separate imagers (mounted, for example, on a common printed circuit board), one for each field of view 330, 340 or the imager may comprise a single component with a single imaging area wherein different fields of view can be imaged onto separate regions of the imaging area. One such suitable imager is the model EV76C560 1.3 MP CMOS image sensor available from e2V of Essex, England and Saint-Egrève, France. Further embodiments and details for such lateral scan views may be found in U.S. patent application Ser. Nos. 12/645,984 and 12/646,829 hereby incorporated by reference.

The imagers described herein may comprise any suitable type such as, for example, a 2-D sensor array, a CMOS imager, and/or a CCD array. Though the imagers 204, 210 may be operable via only ambient light (e.g., controlled by cycling illumination on and off), the data reader includes illumination modules generally aligned with the imaging views. FIGS. 9-12 illustrate an example illumination module arrangement.

Figure 9:
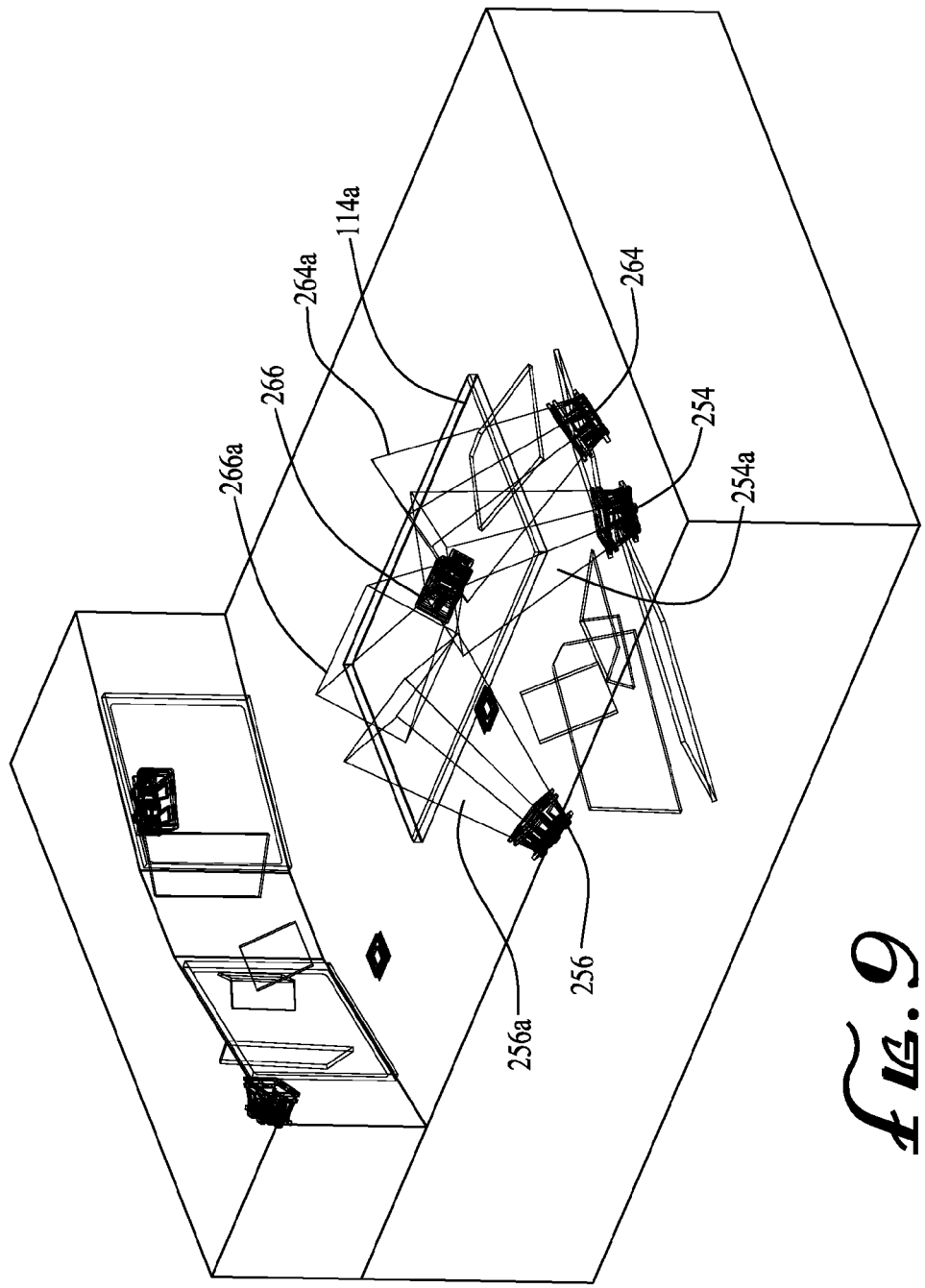
FIG. 9 is a diagrammatic isometric view of the data reader of FIGS. 1-3 showing illumination paths from the lower reader section.
Figure 11:
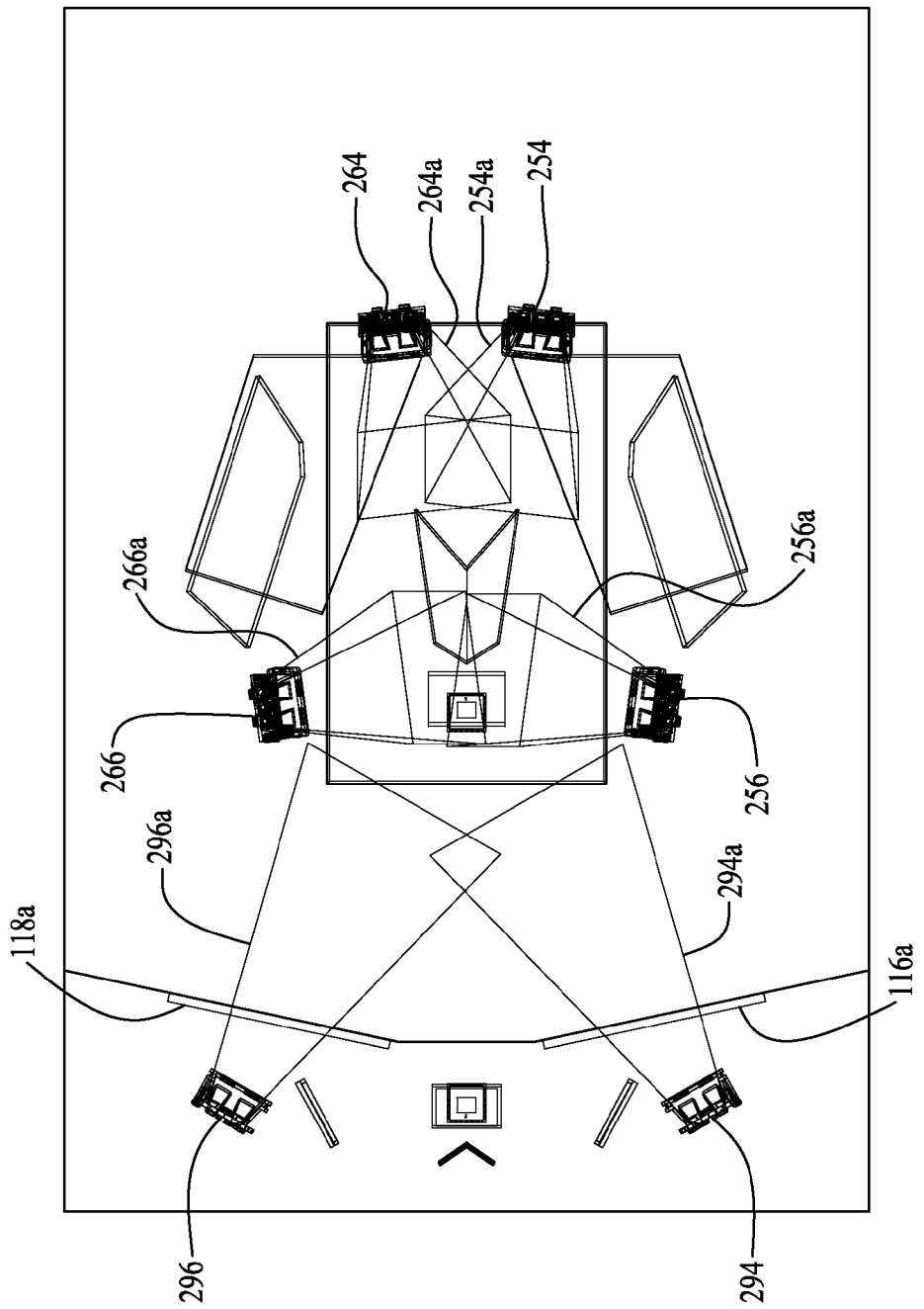
FIG. 11 is a diagrammatic top plan view of the data reader of FIGS. 1-3 showing illumination paths from both the lower reader section and the upper reader section.

FIGS. 9 and 11 show four illumination modules 254, 256, 264, 266 arranged to provide illumination for the views out of lower window 114a. Module 254 projects angularly upward along path 254a toward bottom side 28, trailing side 32 and checker side 34 of the item 20. Module 264 projects angularly upward along path 264a upward toward bottom side 28, leading side 30 and checker side 34 of the item 20. Module 256 projects angularly upward along path 256a toward bottom side 28, trailing side 32 and (to a lesser extent) the customer side 36 of the item 20. Module 266 projects angularly upward along path 266a upward toward bottom side 28, leading side 30 and (to a lesser extent) the customer side 36 of the item 20.

Figure 10:
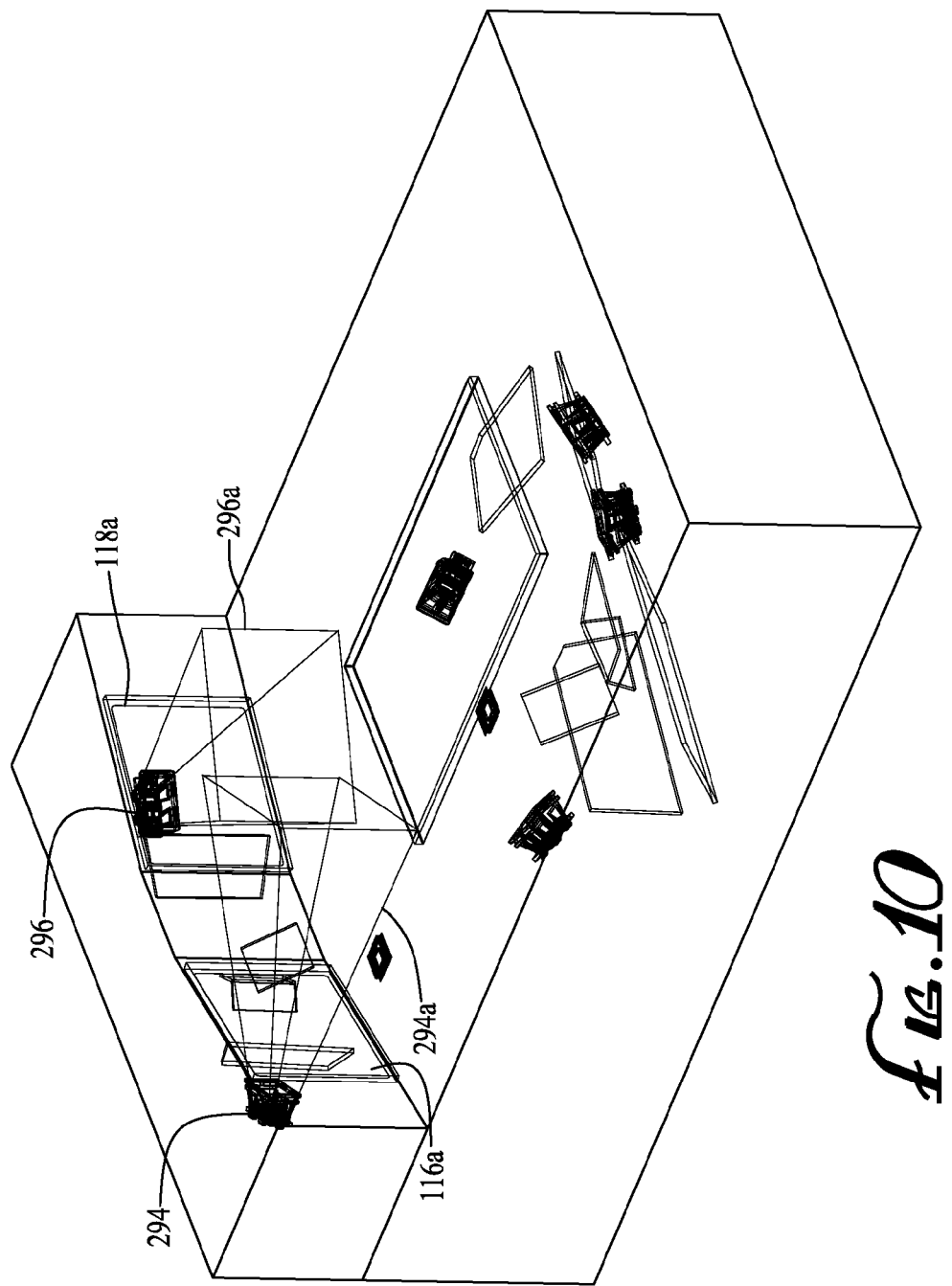
FIG. 10 is a diagrammatic isometric view of the data reader of FIGS. 1-3 showing illumination paths from the upper reader section.

FIGS. 10 and 11 show two illumination modules 294 and 296 arranged to provide illumination for the views out of upper windows 116a, 118a. Module 294 projects angularly inwardly and sidewardly along path 294a toward trailing side 32, customer side 36 and (to a lesser extent) the top side 26 of the item 20. Module 296 projects angularly inwardly and sidewardly along path 294a toward leading side 30, customer side 36 and (to a lesser extent) the top side 26 of the item 20.

Figure 12:
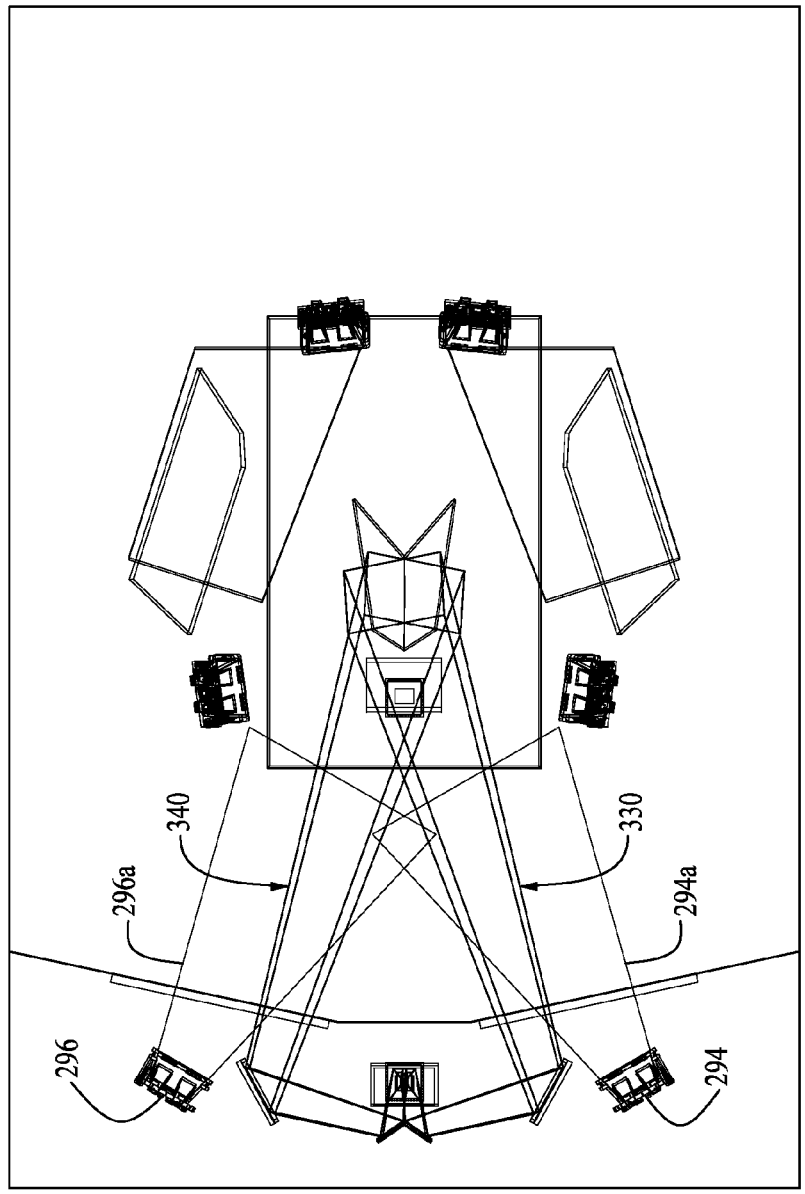
FIG. 12 is a diagrammatic top plan view of the data reader of FIGS. 1-3 showing both imaging paths and illumination paths from the upper reader section.

FIG. 12 illustrates a combination of FIGS. 8 and 11 showing both the top imaging paths 330 and 340 and the top illumination paths 294a and 296a. The illumination from the module 294 is projected along a similar perspective to that of the view path 330. The illumination from the module 296 is projected along a similar perspective to that of the view path 340.

Details of an example illumination module 350 that may be suitable for any of the modules of the previous figures will now be described with reference to FIGS. 13-17. The module 350 include a hollow reflector/module housing 351 with an open rear end expanding to an enlarged front end having a generally rectangular cross-section; and a PCB 360 mounted at the rear end of the housing 351. The reflector housing 351 may alternately be described as a truncated pyramid-shaped reflector, truncated at the rear (smaller) end rather than coming to a point. Other embodiments may use other suitable truncated pyramid-shapes, including other polygonal shapes such as triangular, pentagonal, hexagonal, etc. Truncated pyramid-shaped hollow reflectors 140 may include flat, or substantially flat, sides and are thus simple to prototype and manufacture.

The PCB 360 is secured to the rear end via tabs 352, 354, 356, 358 in the rear of the housing 351, and then mounted or locked in place via screw 370. The PCB 360 includes a plurality of light generators (in this example, six light emitting diodes (LEDs) 363, 364, 365, 366, 367, 368) for providing the desired illumination field. Other types of light generators/sources, or number of LEDs or LED arrangements may be used.

Internal surfaces 351a-d may be made from reflective materials, or include reflective materials or coatings thereon. For example, the hollow reflector 350 is made from injection molded plastic that is (a) reflective, (b) covered with a deposited coating (similar to a flashlight reflector, e.g., silver, aluminum, etc.), or (c) covered with a reflective membrane, such as Vikuti™ Enhanced Specular Reflector manufactured by 3M of St. Paul, Minn., or aluminized Mylar®. Other suitable materials may be used to make hollow reflectors 350, for example, Miro® reflective surfaces manufactured by Alanod of Ennepetal, Germany, or metals that can be polished to an appropriate level of reflectivity. In other embodiments, hollow reflectors, such as reflectors 350, may include a Lambertian or substantially Lambertian reflective surface, in other words, a surface that reflects light isotropically or substantially isotropically.

Different types of light generators 363-368 may emit light in different directional patterns. For example, incandescent lamps and gas-discharge lamps commonly emit light omnidirectionally, with the exception of areas blocked from emitting light such as socket portions of the lamps. Many LEDs emit light in a spatial distribution, for example, a spatial distribution of 120°. Lenses or other optic devices may be included with an LED to change the spatial distribution, for example, by narrowing the spatial distribution to a viewing angle of 60° or 30° or some other desired viewing angle.

The LED in a preferred application, has a light wavelength of 660 nm. Such light wavelength is toward the low sensitivity side of human eye visibility. Other wavelengths may be employed such as 680 nm or 690 nm, but though such wavelength LEDs may be less visible (and thus less distracting if in line of sight of the user), currently those wavelength LEDS tend to be higher cost and less reliable. A suitable LED is the Advanced Power Top View LED model EHP-A09K available from Everlight Electronics Co. Ltd. of Taipei, Taiwan. Multi-wavelength LED's in the visible range (e.g., white light) may also be employed, but such wavelengths may be less effective or responsive illumination for certain imagers, and the illumination may appear brighter and more distracting to the user.

FIG. 18 is a diagrammatic illustration of the data reader 100 with a vertical section 115, configured with a relatively low height h. In such a low height construction, the light path from the illumination modules 294, 296 (module 296 is shown in FIG. 18) may have a wide enough illumination path out through the window 117a in an upwardly angled direction at such an angle as to reach a user's line of sight 400, particularly where the user is short (in stature) or if the user is in a seated position. Moreover, the upper 351a, lower 351b, left 351c and right 351d surfaces of the illumination cone housing 351 are typically reflective to direct and intensify the light from the internal LEDs. Where the bottom surface is reflective, as shown in FIG. 18, the intensity of the light traveling in the upward direction of the illumination path is increased as the user may have a line of sight 400 onto the bottom surface of the illumination cone.

The vertically oriented window 117a may be somewhat inclined or slanted to the vertical. In addition, the direction of illumination from the LEDs may be at an angle (i.e., not at 90 degrees) to the window 117a so as to reduce back reflection off of the window 117a.

FIG. 19 illustrates an alternative module design 350a of like construction to the module 350 illustrated in FIGS. 13-17 (common elements, such as the center LEDs 364, 367, are designated by the same element numerals) whereby only the top inner surface 351a and inner side surfaces 351c, 351d of the housing 351 are reflective but the bottom inner surface 351b of the housing 351 is non-reflective (or only partially reflective). Such a non-reflective bottom surface reduces the amount of light being reflected in the upward direction along the illumination path 400 and thus may reduce the likelihood of the illumination from being in a direction into the user's line of sight.

The bottom inner surface 351b of the housing 351 is described as being non-reflective, but may alternately be described as having relatively low reflectivity as opposed to the top inner side surface 351a and lateral inner side surfaces 351c, 351d which have reflective or highly reflective surfaces (one with highly specular reflection). Alternately, the bottom surface 351b may comprise a diffuse reflective surface so as to reduce direct specular reflection of illumination from the LED's along the line of sight of the user.

Alternately, the reflectivity of a particular surface need not be uniform. For example, the bottom surface 351b of the housing 351 may be a highly reflective mirror surface for much of a first area/region near the PCB 360, but a second area of the bottom surface 351b near the exit aperture 375 may comprise the non-reflective (or diffusely reflective) portion.

The reflective property of the surface may alternately be described as to its ability/property to absorb light. A non-reflective surface may be described as a light absorbing surface, such as a black surface that is 90%+ absorbent and 10% reflective. On the other hand, a highly reflective surface may be described as having a 90% efficient reflectivity, and a low reflective surface may have a 20% efficient reflectivity.

Light emitted from LEDs tends to be concentrated in a relatively narrow spatial distribution, and may appear to viewers as concentrated point sources of light. To further reduce direct brightness to the user, an optional diffuser 380 is disposed within the housing 351 at a tilt angle of about 45 degrees, spanning the top-front of the cone housing 351 to the bottom back just in front of the LEDs. The tilt angle of the diffuser 380 may be described as being disposed in the reflector housing 351 at a tilt angle 8 relative to the outgoing illumination path (a central illumination path illustrated by the dashed line 390 in FIGS. 18-19), wherein a bottom of the diffuser 380 is adjacent the LEDs and a top of the diffuser 380 is distal to the LEDs and adjacent to the exit aperture 375.

The diffuser 380 may comprise a single piece of diffuser material, but may be made from separate pieces of diffuser materials. The diffuser 380 may be constructed from any suitable diffusing material, such as for example, Roscolux #117 (available from Roscolab, Ltd., London, England), Lee Filter 252 eighth white diffusion (available from Lee Filters, Ltd., Andover, England), Fusion Optic ADF6060 (available from Fusion Optix, Inc., Woburn, Mass.), or Luminit LSD Film (available from Luminit, LLC, Torrance, Calif.), may be used. Interposing the diffuser 380 in the outgoing illumination path may provide advantages such as one or more of the following: (a) reducing specular highlights, (b) diminishing the harsh appearance of point sources of light, or (c) providing a final appearance of a bar of light to a viewer. A bar of light appearance is generally rectangular-shaped and may include a uniform light distribution over the surface. A bar of light appearance may include regions of higher intensity light, but preferably such high intensity regions do not appear to a viewer to be individual points of light. Adding a diffuser surface over the face of hollow reflectors may make bright point sources more visually appealing, for example, by reducing specular highlights.

Further details and alternate constructions that may be combined with the illumination module 350 are described in U.S. published application No. 2012/0074338 hereby incorporated by reference.

The shape of the hollow reflectors of illumination module 350 (of FIGS. 13-19) or of illumination module 450 (of FIG. 20) may be the rectangular, truncated pyramid-shaped and symmetric structure as illustrated, but other geometric shapes, asymmetric designs, or both may be used. For example, a conical shape of circular or oval cross-section may comprise a reflective inner top surface over a non-reflective inner surface of an arcuate bottom portion.

FIGS. 20-22 illustrate an illumination module according to a second alternate embodiment with FIG. 21 being an isometric view, FIG. 21 being a front side elevation view and FIG. 22 being a cross-sectional diagrammatic side view of an illumination module 450 according to a second alternate embodiment. The module 450 comprises a housing 451 having a top wall section 452 and a bottom wall section 456. The module 450 has three sections, each have a pair of LEDs 462a, 462b, 462c, 462d. The LEDs (such as representative LED pair 462 shown in FIG. 22) are mounted on a PCB 460 proximate the rear of the inner housing chamber but along the bottom wall 456 and aimed upwardly (or could be aimed upwardly and forwardly). The top wall 452 is constructed with a rear top section 455 (having an inner reflective surface 455a) arranged at a first angle (to horizontal) and front top section 454 (having an inner reflective surface 454a) arranged at a second angle (to horizontal). The bottom wall section 456 is constructed with a rear reflective inner surface 456a and a front non-reflective inner surface 456b. The lateral side surfaces are not illustrated but are similar to those of the prior embodiments.

Illumination from the LED 462 is reflected by the various reflective surfaces thus concentrating and directing the LED light outwardly into the view volume. The paths of three sample light rays will be described to illustrate certain features of the module 450. A first light ray 492 directed upwardly (and somewhat rearwardly) reflects off the rear top section inner surface 455a and along a path directly out through the outer aperture 490. A second light ray 494 directed upwardly and forwardly reflects off the front top section inner surface 454a and is reflected downwardly onto the bottom wall rear reflective inner surface 456a and then out through the aperture 490 at a moderate upward angle.

The third light ray 496, directed mostly upward, is reflected multiple times between the front top section inner surface 454a and the bottom wall rear reflective inner surface 456a until the a last reflection on the front non-reflective inner surface 456b. The prospective angle of reflection of the third ray 496 would be at a more steeply vertical/upward direction (shown by the dashed line 496a) which would thus comprise a light that would undesirable reach the eyes of the user, but since the front inner surface 456b is a non-reflective or less reflective surface, the light intensity along the path of the third light ray reaching the user is reduced or eliminated.

To further reduce direct brightness to the user, an optional diffuser 480 may be disposed within the housing 451 at a tilt angle β of about 45 degrees, spanning the top-front of the cone housing 451 to the bottom back in similar fashion to that described with respect to the prior embodiment. The diffuser 480 may alternately be arranged at a different angle and/or location such as at the exit aperture 490.

Illumination modules 294, 296 are sidewardly-facing modules oriented to project light out through vertical windows 116a, 118a and illumination modules 254, 256, 264, 266 are sidewardly and upwardly-facing modules oriented to project light upwardly through horizontal windows 114, 114a. Though the illumination modules 350 and 450 are illustrated in a sidewardly-facing orientation outward through a vertical window, these modules may be positioned in various locations/orientations and through either vertical or horizontal windows. For example, the modules may be positioned in alternate locations/orientations such as the modules 254, 256, 264, 266 illuminating upwardly through horizontal windows 114, 114a.

The structure of the reflectivity of opposing inner side surfaces of the module housing may be selected to provide the desired reflectivity effect depending upon the expected position of the user or customer. For example, if a user/customer is in a position at a left side of an illumination module (with the module projecting out of either a vertical or horizontal window), the module housing may be constructed with a non-reflective surface on the right side and a reflective surface on the (opposite) left side. For example, if a user/customer is in a position a left side of an illumination module, the module housing may be constructed with a non-reflective surface on the right side and a reflective surface on the (opposite) left side.

Though described primarily with respect to a checker-assisted data reader, the readers and methods described herein may be employed at a checkstand in a self-checkout system. The optical readers described herein may be employed in an automatic reader, such as a tunnel scanner employing multiple housing portions that obtain multiple perspectives through multiple viewing windows.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A data reader comprising:
a reader housing constructed and arranged for installation at a checkstand, the reader housing having a window;
an illumination module disposed in the reader housing, the illumination module comprising
a reflector housing comprised of a pyramid-shaped structure of generally rectangular cross-section, with a top inner surface and a bottom inner surface, wherein the pyramid-shaped structure has an increasing cross-sectional area from a rear end to a front end,
a light source disposed at the rear end of the reflector housing and operative to generate illumination out through the reflector housing along an outgoing illumination path, wherein the top inner surface of the reflector housing comprises a surface of high reflectivity relative to the bottom inner surface of the reflector housing that comprises a surface of low reflectivity.

2. A data reader according to claim 1 further comprising a diffuser disposed in the reflector housing at a tilt angle relative to the outgoing illumination path, wherein a bottom of the diffuser is adjacent the light source and a top of the diffuser is distal to the light source.

3. A data reader according to claim 1, wherein the bottom inner surface of the reflector housing is non-reflective.

4. A data reader according to claim 1, wherein the light source comprises a plurality of light emitting diodes (LEDs).

5. A data reader comprising:
a reader housing constructed and arranged for installation at a checkstand, the reader housing having a window;
an illumination module disposed in the reader housing behind the window, the illumination module having
a reflector housing comprised of a pyramid-shaped structure of generally rectangular cross-section, with opposing inner side surfaces comprising (1) a top inner surface and a bottom inner surface opposite thereto and (2) a left inner surface and a right inner surface opposite thereto, the pyramid-shaped structure increasing in cross-sectional area from a rear end to a front end,
a light source disposed proximate the rear end of the reflector housing and operative to generate illumination out through the reflector housing along an outgoing illumination path,
wherein a first inner surface of the reflector housing comprises a surface of high reflectivity and at least a portion of a corresponding second surface of the reflector housing opposite the first inner surface comprises a surface of relatively low reflectivity.

6. A method for data reading comprising the steps of
passing an object to be read through a scan region in front of a window of a data reader;
illuminating the scan region by the steps of
generating light from a light source disposed in the reader housing behind the window,
concentrating the light via an illumination module comprising a reflector housing comprised of a pyramid-shaped structure of generally rectangular cross-section, with opposing inner side surfaces comprising (1) a top inner surface and a bottom inner surface opposite thereto and (2) a left inner surface and a right inner surface opposite thereto, the cross-sectional area of the pyramid-shaped structure increasing from a rear end to a front end;
limiting the angular distribution of light emanating from the illumination module by forming the reflector housing with a first inner surface of high reflectivity and a corresponding second inner surface opposite the first inner surface of low reflectivity.

7. A method according to claim 6 further comprising diffusing the light emanating from the illumination module with a diffuser disposed in the reflector housing.

8. A method according to claim 7 wherein the diffuser is disposed in the reflector housing at a tilt angle relative to the outgoing illumination path, wherein a bottom of the diffuser is proximate to the light source and a top of the diffuser is distal to the light source.

9. A method according to claim 6, wherein the second inner surface is non-reflective.

10. A method according to claim 6, further comprising generating light from the light source comprising a plurality of light emitting diodes (LEDs).

11. A data reader comprising:
a reader housing constructed and arranged for installation at a checkstand, the reader housing having a window;
an illumination module disposed in the reader housing, the illumination module comprising
a reflector housing comprised of a pyramid-shaped structure of generally polygonal cross-section, with a top inner surface and a bottom inner surface, wherein the pyramid-shaped structure has an increasing cross-sectional area from a rear end to a front end,
a light source disposed at the rear end of the reflector housing and operative to generate illumination out through the reflector housing along an outgoing illumination path,
wherein the top inner surface of the reflector housing comprises a surface of high reflectivity relative to the bottom inner surface of the reflector housing that comprises a surface of low reflectivity.

12. A data reader according to claim 11 further comprising a diffuser disposed in the reflector housing at a tilt angle relative to the outgoing illumination path, wherein a bottom of the diffuser is adjacent the light source and a top of the diffuser is distal to the light source.

13. A data reader according to claim 11, wherein the bottom inner surface of the reflector housing is non-reflective.

14. A data reader according to claim 11, wherein the light source comprises a plurality of light emitting diodes (LEDs).

15. A data reader according to claim 11, wherein the polygonal cross-section is selected from the group consisting of: triangular, rectangular, pentagonal, and hexagon cross-sections.

* * * * *

UNITED STATES PATENT AND TRADEMARK OFFICE
CERTIFICATE OF CORRECTION

| | | |
|---|---|---|
| PATENT NO. | : 9,305,198 B2 | |
| APPLICATION NO. | : 13/911854 | |
| DATED | : April 5, 2016 | |
| INVENTOR(S) | : Ryan B. Thompson and Alan Shearin | |

It is certified that error appears in the above-identified patent and that said Letters Patent is hereby corrected as shown below:

Specification

Column 4
Line 59, after "Details of" delete "an".

Column 8
Line 46, change "8" to --0--.

Column 9
Line 55, after "until the" delete "a".
Line 59, change "undesirable" to --undesirably--.

Column 10
Line 26, after "position" insert --at--.

Signed and Sealed this
Twenty-eighth Day of June, 2016

Michelle K. Lee
*Director of the United States Patent and Trademark Office*